(12) United States Patent
Wang et al.

(10) Patent No.: US 12,685,934 B2
(45) Date of Patent: Jul. 21, 2026

(54) DETERMINATION METHOD, DETERMINATION APPARATUS OF CALIBRATION INFORMATION AND ELECTRONIC DEVICE

(71) Applicant: BEIJING ZITIAO NETWORK TECHNOLOGY CO., LTD., Beijing (CN)

(72) Inventors: Xionghui Wang, Beijing (CN); Xiangqian Shu, Beijing (CN); Hengkai Guo, Beijing (CN); Yitong Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 477 days.

(21) Appl. No.: 18/041,324

(22) PCT Filed: Nov. 2, 2022

(86) PCT No.: PCT/CN2022/129166
§ 371 (c)(1),
(2) Date: Feb. 10, 2023

(87) PCT Pub. No.: WO2023/216526
PCT Pub. Date: Nov. 16, 2023

(65) Prior Publication Data
US 2024/0261677 A1     Aug. 8, 2024

(30) Foreign Application Priority Data

May 10, 2022     (CN) .......................... 202210509321.9
Jul. 7, 2022     (CN) .......................... 202210802768.5

(51) Int. Cl.
*A63F 13/52*     (2014.01)
*G06T 7/50*     (2017.01)
(Continued)

(52) U.S. Cl.
CPC ................ *A63F 13/52* (2014.09); *G06T 7/50* (2017.01); *G06T 7/73* (2017.01); *G06T 7/80* (2017.01);
(Continued)

(58) Field of Classification Search
CPC ............. A63F 13/52; A63F 2300/8082; G06T 19/006; G06T 2207/10016;
(Continued)

(56) References Cited

U.S. PATENT DOCUMENTS 8,452,080 B2 * 5/2013 Engedal .................... G06T 7/75
382/154
9,805,512 B1 * 10/2017 Katz .................... G02B 27/017
(Continued)

FOREIGN PATENT DOCUMENTS

CA     2926861 C  * 3/2017  ........... G02B 27/017
CN     109345597 A    2/2019
(Continued)

OTHER PUBLICATIONS

Thesis by Zi-ye Zhang, Development of Virtual Swimming Training Simulating Device, Southeast University, School of Mechanical Engineering, Jun. 2018, English translation of abstract only (78 pages).
(Continued)

*Primary Examiner* — Steven J Hylinski

(57)     ABSTRACT

The present disclosure relates to a determination method, an determination apparatus of calibration information and electronic device, and particularly to the technical field of images. The determination method includes: acquiring 3D key point coordinates and a pose of a target device in a Virtual Reality (VR) world coordinate system determined by a VR device, wherein the target device is associated with the VR device; acquiring a target image collected by an image
(Continued)

acquisition device, and acquiring 2D key point coordinates of the target device in a camera coordinate system based on the target image; and determining calibration information of the image acquisition device in the VR world coordinate system according to the 2D key point coordinates, the 3D key point coordinates, the pose of the target device and a pose of the image acquisition device, wherein the calibration information comprises position information and orientation information.

17 Claims, 9 Drawing Sheets

(51) Int. Cl.
| | | |
|---|---|---|
| *G06T 7/73* | (2017.01) | |
| *G06T 7/80* | (2017.01) | |
| *G06T 19/00* | (2011.01) | |

(52) U.S. Cl.
CPC .... *G06T 19/006* (2013.01); *A63F 2300/8082* (2013.01); *G06T 2207/10016* (2013.01); *G06T 2207/20081* (2013.01); *G06T 2207/20084* (2013.01); *G06T 2207/20221* (2013.01); *G06T 2207/30196* (2013.01); *G06T 2207/30244* (2013.01)

(58) Field of Classification Search
CPC . G06T 2207/20081; G06T 2207/20084; G06T 2207/20221; G06T 2207/30196; G06T 2207/30244; G06T 7/50; G06T 7/70; G06T 7/73; G06T 7/80
See application file for complete search history.

(56) References Cited

U.S. PATENT DOCUMENTS

| | | | | |
|---|---|---|---|---|
| 10,914,951 | B2 * | 2/2021 | Liu | G02B 27/017 |
| 2015/0049201 | A1 * | 2/2015 | Liu | H04L 12/1827 |
| | | | | 348/189 |
| 2017/0061693 | A1 * | 3/2017 | Kohler | G06T 19/006 |
| 2017/0118539 | A1 * | 4/2017 | Lokshin | G11B 27/031 |
| 2019/0096106 | A1 | 3/2019 | Shapiro et al. | |

| | | | |
|---|---|---|---|
| 2019/0212359 | A1 | 7/2019 | Erivantcev et al. |
| 2019/0361589 | A1 | 11/2019 | Yerli |
| 2020/0368616 | A1 | 11/2020 | Delamont |
| 2021/0019526 | A1 | 1/2021 | Sinclair |
| 2021/0409677 | A1 | 12/2021 | Milk et al. |

FOREIGN PATENT DOCUMENTS

| | | | | | |
|---|---|---|---|---|---|
| CN | 109801379 | A | 5/2019 | | |
| CN | 110415293 | A | 11/2019 | | |
| CN | 110531846 | A | 12/2019 | | |
| CN | 111307146 | A | 6/2020 | | |
| CN | 112488972 | A | 3/2021 | | |
| CN | 112698769 | A | 4/2021 | | |
| CN | 112991556 | A | 6/2021 | | |
| CN | 113262465 | A | 8/2021 | | |
| CN | 114066814 | A | 2/2022 | | |
| CN | 114067087 | A | 2/2022 | | |
| CN | 114372990 | A | 4/2022 | | |
| CN | 114401414 | A | 4/2022 | | |
| CN | 115100276 | A | 9/2022 | | |
| DE | 202017105894 | U1 * | 4/2018 | ............ | G06T 15/04 |
| EP | 2558176 | B1 | 11/2018 | | |
| JP | 2012155678 | A | 8/2012 | | |
| WO | 2017027338 | A1 | 2/2017 | | |
| WO | 2021/158768 | A1 | 8/2021 | | |
| WO | 2022040920 | A1 | 3/2022 | | |

OTHER PUBLICATIONS

Scherfgen, D., "Estimating the Pose of a Medical Manikin for Haptic Augmentation of a Virtual Patient in Mixed Reality Training," SVR'21, Oct. 18-21, 2021, Virtual Event, Brazil (9 pages).

European Search Report for EP Patent Application No. 22851381.8, Issued on Feb. 13, 2024, 10 pages.

Office Action for Chinese Application No. 202011156661.5, mailed on Nov. 1, 2024, 16 pages.

Reality Mixer: Mixed Reality app for iOS, username fabio914, Nov. 5, 2022, available at https://github.com/fabio914/RealityMixer/blob/main/README.md.

Communication pursuant to Article 94(3) EPC for European Application No. 22851381.8, mailed Oct. 25, 2024, 10 pages.

Takemura M., et al., "Diminishing Head-Mounted Display for Shared Mixed Reality," Proceedings. International Symposium on Mixed and Augmented Reality, Sep. 2002, 8 pages.

* cited by examiner

DETERMINATION METHOD, DETERMINATION APPARATUS OF CALIBRATION INFORMATION AND ELECTRONIC DEVICE

CROSS-REFERENCE TO RELATED APPLICATIONS

The present disclosure is a U.S. National Stage Application under 35 U.S.C. § 371 of International Patent Application No. PCT/CN2022/129166, filed on Nov. 2, 2022, which is based on and claims priority of Chinese application for invention No. 202210509321.9, filed on May 10, 2022, and Chinese application for invention No. 202210802768.5, filed on Jul. 7, 2022, the disclosure of which is hereby incorporated into this disclosure by reference in its entirety.

TECHNICAL FIELD

The present disclosure relates to the field of image technology, in particular to a determination method, an determination apparatus of calibration information and electronic device.

BACKGROUND

In Virtual Reality (VR) game scenes, in order to obtain mixed reality capture (MRC) images, it is necessary to repeatedly wear and remove VR devices, move gamepads, take images in different situations through a mobile phone, and calculate position information and orientation information of the mobile phone (or a camera of the mobile phone) in the VR world coordinate system of a VR device.

SUMMARY

In a first aspect, a determination method of calibration information is provided, comprising:

acquiring 3D key point coordinates and a pose of a target device in a VR world coordinate system determined by a VR device, wherein the target device is associated with the VR device;

acquiring a target image collected by an image acquisition device, and acquiring 2D key point coordinates of the target device in a camera coordinate system based on the target image; and determining calibration information of the image acquisition device in the VR world coordinate system according to the 2D key point coordinates, the 3D key point coordinates, the pose of the target device and a pose of the image acquisition device, wherein the calibration information comprises position information and orientation information.

As an optional embodiment of the present disclosure, the acquiring 3D key point coordinates and a pose of a target device in a VR world coordinate system determined by a VR device comprises:

receiving the 3D key point coordinates and the pose of the target device in the VR world coordinate system sent from the VR device.

As an optional embodiment of the present disclosure, the acquiring a target image collected by an image acquisition device comprises:

acquiring an original image of the target device collected by the image acquisition device; and determining an image of a region of the target device from the original image, and cropping the image of the region of the target device from the original image as the target image.

As an optional embodiment of the present disclosure, the acquiring 2D key point coordinates of the target device in a camera coordinate system based on the target image comprises:

inputting the target image into a key point extraction model, to obtain 2D key point coordinates of the target device output by the key point extraction model, wherein the key point extraction model is a convolutional neural network model trained based on sample information comprising a plurality of sample images of the target device and 2D key point coordinates corresponding to the target device of each sample image.

As an optional embodiment of the present disclosure, the determination method further comprises:

receiving a first screen image sent from the VR device after determining the calibration information of the image acquisition device in the VR world coordinate system; and acquiring a second screen image from a perspective of the image acquisition device based on the calibration information and the first screen image.

As an optional embodiment of the present disclosure, the determination method further comprises:

acquiring a real scene image of a user of the VR device collected by the image acquisition device after determining the calibration information of the image acquisition device in the VR world coordinate system;

acquiring a user screen image from the real scene image;

acquiring a prop screen image from the perspective of the image acquisition device, the prop screen image being a screen image of a prop associated with the target device; and fusing the second screen image, the user screen image and the prop screen image to obtain a MRC image.

As an optional embodiment of the present disclosure, the determination method further comprises:

determining at least one of a first layer relationship or a second layer relationship before fusing the second screen image, the user screen image and the prop screen image to obtain the MRC image, wherein the first layer relationship is a layer relationship between the user screen image and the second screen image, the second layer relationship is a layer relationship between the user screen image and the prop screen image, and at least one of the first layer relationship or the second layer relationship are used for fusing the second screen image, the user screen image and the prop screen image to obtain the MRC image.

As an optional embodiment of the present disclosure, the determining a first layer relationship comprises:

performing depth estimation on the real scene image to obtain first depth information of the real scene image;

acquiring second depth information of the second screen image; and determining the first layer relationship between the user screen image and the second screen image according to the first depth information and the second depth information.

As an optional embodiment of the present disclosure, the determining a second layer relationship comprises:

determining the second layer relationship between the user screen image and the prop screen image in case that a target part of the user is detected to be visible in the real scene image, wherein the target part is a part where the target device is worn or held.

As an optional embodiment of the present disclosure, the acquiring a user screen image from the real scene image comprises:

inputting the real scene image into a target matting model; and acquiring a user screen image in the real scene image output by the target matting model, wherein the target matting model is obtained through training based on a set of sample images comprising multiple composite images, each composite image being obtained by fusing a user image and an indoor scene image.

As an optional embodiment of the present disclosure, the target device is worn on or held by a target part of the user.

As an optional embodiment of the present disclosure, the VR device is worn by the user in the user image.

As an optional embodiment of the present disclosure, the determination method further comprises:

acquiring a user green screen video before inputting the real scene image into the target matting model, the user green screen video being a user video collected in a green screen scene;

determining the user image of each frame of the user green screen video according to a full picture region of the user green screen video and a green screen region in the frame;

fusing the user image of each frame with an indoor scene image to obtain multiple composite images; and determining a set of sample images based on the multiple composite images, and training an initial matting model based on the set of sample images to obtain the target matting model.

As an optional embodiment of the present disclosure, the determining the user image of each frame of the user green screen video according to a full picture region of the user green screen video and a green screen region in the frame comprises:

acquiring a green screen region in each frame of the user green screen video;

performing pixel completion on the green screen region of each frame to obtain a green screen completion region of the frame;

calculating an intersection of the green screen completion regions of the various frames to obtain a minimum green screen completion region;

removing the minimum green screen completion region from the full picture region of the user green screen video to obtain a green screen excluded region;

calculating the union of the green screen excluded region and a green screen extraction region of each frame to obtain a non-user image region of each frame, the green screen extraction region of each frame being a remaining green screen region after user image extraction based on the green screen region of each frame; and determining the user image for each frame according to the full picture region and the non-user image region of the frame.

As an optional embodiment of the present disclosure, fusing the user image of each frame with an indoor scene image to obtain multiple composite images comprises:

determining a first coordinate vector of a user positioning point of a target user image which is a user image of any one of the frames;

determining a second coordinate vector of a target positioning point in the indoor scene image;

4 calculating an offset vector according to the first coordinate vector and the second coordinate vector; and fusing the target user image into the indoor scene image based on the offset vector to obtain a target composite image, wherein the user positioning point of the user image is located at the target positioning point in the indoor scene image.

As an optional embodiment of the present disclosure, the user positioning point is a center point of a bottom edge of a bounding rectangle of the target user image; and the target positioning point is an arbitrary point in the indoor scene image.

As an optional embodiment of the present disclosure, the target user image comprises a user foot feature, and the target positioning point is a center point of a ground region in the indoor scene image; or the target user image does not comprise a user foot feature, and the target positioning point is an arbitrary point on a bottom edge of the indoor scene image.

In a second aspect, a determination apparatus of calibration information is provided, the apparatus comprising:

an acquisition module for acquiring 3D key point coordinates and a pose of a target device in a Virtual Reality (VR) world coordinate system determined by a VR device, wherein the target device is associated with the VR device; and acquiring a target image collected by an image acquisition device, and acquiring 2D key point coordinates of the target device in a camera coordinate system based on the target image; and a calibration module for determining calibration information of the image acquisition device in the VR world coordinate system according to the 2D key point coordinates, the 3D key point coordinates, the pose of the target device and a pose of the image acquisition device, wherein the calibration information comprises position information and orientation information.

As an optional embodiment of the present disclosure, the acquisition module is particularly used for:

receiving the 3D key point coordinates and the pose of the target device in the VR world coordinate system sent from the VR device.

As an optional embodiment of the present disclosure, the acquisition module is particularly used for:

acquiring an original image of the target device collected by the image acquisition device; and determining an image of a region of the target device from the original image, and cropping the image of the region of the target device from the original image as the target image.

As an optional embodiment of the present disclosure, the acquisition module is particularly used for:

inputting the target image into a key point extraction model, to obtain 2D key point coordinates of the target device output by the key point extraction model, wherein the key point extraction model is a convolutional neural network model trained based on sample information comprising a plurality of sample images of the target device and 2D key point coordinates corresponding to the target device of each sample image.

As an optional embodiment of the present disclosure, the acquisition module is further used for, receiving a first screen image sent from the VR device after determining the calibration information of the image acquisition device in the VR world coordinate system;

the apparatus further comprises:

an image generation module for:

acquiring a second screen image from a perspective of the image acquisition device based on the calibration information and the first screen image.

As an optional embodiment of the present disclosure, the image generation module is further used for:

acquiring a real scene image of a user of the VR device collected by the image acquisition device after determining the calibration information of the image acquisition device in the VR world coordinate system;

acquiring a user screen image from the real scene image;

acquiring a prop screen image from the perspective of the image acquisition device, the prop screen image being a screen image of a prop associated with the target device; and fusing the second screen image, the user screen image and the prop screen image to obtain a MRC image.

As an optional embodiment of the present disclosure, the image generation module is further used for:

determining at least one of a first layer relationship or a second layer relationship before fusing the second screen image, the user screen image and the prop screen image to obtain the MRC image, wherein the first layer relationship is a layer relationship between the user screen image and the second screen image, and the second layer relationship is a layer relationship between the user screen image and the prop screen image;

wherein the image generation module is particularly used for:

fusing the second screen image, the user screen image and the prop screen image to obtain the MRC image according to at least one of the first layer relationship or the second layer relationship.

As an optional embodiment of the present disclosure, the image generation module is particularly used for:

performing depth estimation on the real scene image to obtain first depth information of the real scene image;

acquiring second depth information of the second screen image; and determining the first layer relationship between the user screen image and the second screen image according to the first depth information and the second depth information.

As an optional embodiment of the present disclosure, the image generation module is particularly used for:

determining the second layer relationship between the user screen image and the prop screen image in case that a target part of the user is detected to be visible in the real scene image, wherein the target part is a part where the target device is worn or held.

In a third aspect, an electronic device is provided, comprising:

a memory; and a processor coupled to the memory, the processor configured to execute the determination method of calibration information provided in the first aspect or any optional embodiment of the present disclosure.

In a fourth aspect, a non-transitory computer-readable storage medium is provided, wherein a computer program is stored on the non-transitory computer-readable storage medium, which when executed by a processor implements the determination method of calibration information provided in the first aspect or any optional embodiment of the present disclosure.

In a fifth aspect, a computer program product is provided, the computer program product comprising: the computer program product that, when executed on a computer, causes the computer to implement the determination method of calibration information provided in the first aspect or any optional embodiment of the present disclosure.

BRIEF DESCRIPTION OF THE DRAWINGS

Herein, the accompanying drawings, which are incorporated in and constitute a part of this specification, illustrate embodiments of the present disclosure and, together with the description, serve to explain the principles of the present disclosure.

In order to more clearly explain the embodiments of the present invention or the technical solutions in the prior art, a brief introduction will be given below for the drawings required to be used in the description of the embodiments or the prior art. It is obvious that, for a person skilled in the art, he or she may also acquire other drawings according to such drawings on the premise that no inventive effort is involved.

DETAILED DESCRIPTION

In order to better understand the above objects, features and advantages of the present disclosure, the scheme of the present disclosure will be further described below. It should be noted that, in the case of no conflict, the embodiments and the features of the embodiments of the present disclosure may be combined with each other.

Many specific details are set forth in the following description to facilitate a full understanding of the present disclosure, but the present disclosure can also be implemented in other ways different from those described herein. Obviously, embodiments described in the description are only some embodiments of the present disclosure, and are not all of embodiments thereof.

At present, in VR game scenes, in order to obtain MRC images, it is necessary to repeatedly wear and remove VR devices, move gamepads to record relevant data of a mobile phone at different positions, and calculate position information and orientation information of a camera of the mobile phone in the VR world coordinate system of the VR device according to the recorded data. This calibration process is tedious, and the way to obtain calibration information is complex and less efficient.

In order to solve the above problems, the embodiments of the present disclosure provide a method, apparatus and electronic device for determining calibration information, which can calculate relevant data of calibration information for an image acquisition device in the VR world coordinate system without manually moving the position of the image acquisition device during the calibration process. For the acquisition of 2D key point coordinates, 3D key point coordinates, the pose of the target device, the pose of the image acquisition device and other parameters, it is also unnecessary to wear and remove the VR device repeatedly. Therefore, the calibration process can be simplified, and calibration information of the image acquisition device in the VR world coordinate system can be determined in a simple and efficient manner.

The determination method of calibration information provided in the embodiment of the present disclosure can be realized by an electronic device, or a determination apparatus of calibration information, which is a functional module or functional entity in an electronic device used to implement the determination method of calibration information.

The above electronic device can be a computer, a tablet, a mobile phone, a laptop, a handheld computer, a vehicle terminal, a wearable device, an ultra-mobile personal computer (UMPC), a netbook or a personal digital assistant (PDA), a personal computer (PC), etc., which is not specifically limited in the embodiments of the present disclosure.

Figure 1A:
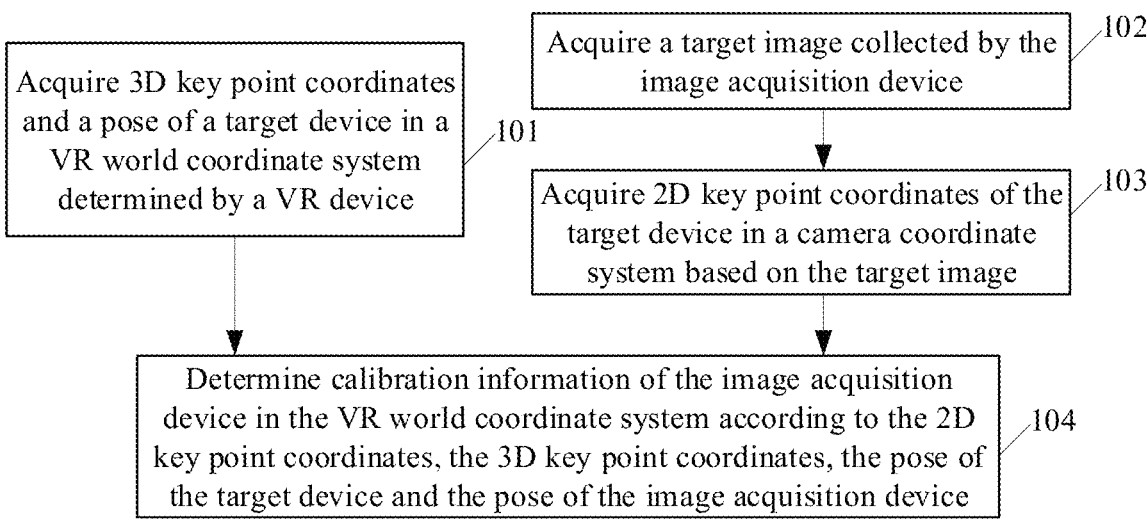
FIG. 1A is a flowchart of a determination method of calibration information provided by an embodiment of the present disclosure.

FIG. 1A is a flowchart of a determination method of calibration information provided by an embodiment of the present disclosure. The method comprises the following steps.

101: acquiring 3D key point coordinates and a pose of a target device in a VR world coordinate system determined by a VR device.

In some embodiments, devices used to implement the determination method of calibration information comprise, but are not limited to, a VR device, an image acquisition device, and a target device.

In a situation, the above determination apparatus of calibration information may be an image acquisition device.

In another situation, the above determination apparatus of calibration information may be a functional module and/or a functional entity integrated in a VR device.

In still another situation, the above determination apparatus of calibration information may be an independent device other than the VR device, the image acquisition device and the target device.

In one embodiment, the determination apparatus of calibration information is an image acquisition device, and the VR device can send 3D key point coordinates and a pose of the target device in the VR world coordinate system to the image acquisition device in real time. Accordingly, the image acquisition device can receive the 3D key point coordinates and the pose of the target device in the VR world coordinate system sent from the VR device.

Furthermore, when the VR device sends the 3D key point coordinates and the pose of the target device in the VR world coordinate system to the image acquisition device, it can also send a timestamp when the 3D key point coordinates and the pose of the target device are acquired to the image acquisition device.

In the above embodiment, the image acquisition device can acquire the 3D key point coordinates and the pose of the target device in the VR world coordinate system by communicating with the VR device if the determination apparatus of calibration information is an image acquisition device. In this way of parameter acquisition, the parameter acquisition process can be easily realized by communicating with the VR device without repeatedly wearing or removing the VR device, moving the image acquisition device, and complex operations.

The VR device can establish communication connections with the target device and the image acquisition device respectively.

In an embodiment of the present disclosure, the VR device can be a VR head mounted display device, and the image acquisition device can be a camera, a mobile phone, a tablet, or a smart watch.

The above target device can be associated with a user's target part, collect action parameters of the target part, and transmit these action parameters to the VR device. For example, the target device can be a device that can be worn or held by any part of the user, such as a gamepad, bracelet, mask, shoes, a foot ring, etc.

The above 3D key point coordinates can comprise coordinates of one or more key feature points of the target device. For example, any feature point on the target device can be used as a key feature point, or multiple feature points on the target device that can represent the contour of the target device can be used as the key feature points; as another example, multiple feature points of some special structures on the target device can be used as the key feature points.

102: acquiring a target image collected by the image acquisition device.

The above target image can be an original image of the target device acquired by the image acquisition device, or a portion of the original image.

In some embodiments, the original image of the target device can be collected by the image acquisition device. Then, a target device region in the original image can be determined, and an image of a region of the target device can be cropped from the original image as the target image.

The image of the region of the target device refers to an image of a region comprising the target device in the original image. For example, a bounding rectangle of the target device in the original image can be determined first, and an image of the region of the bounding rectangle can be used as the target image.

In some embodiments, collecting an original image of the target device by the image acquisition device can comprise: collecting a real scene image by the image acquisition device to obtain an original image comprising the target device held or worn by the user, determining the image of the region of the target device by detecting the target device in the original image, and then cropping the image of the region of the target device from the original image as the target image.

Through the above embodiment, in the process of acquiring 2D key point coordinates of the target device based on the original image collected by the image acquisition device, the target device is first detected from the original image to determine a smaller image of the region of the target device from the larger original image, which can reduce the amount of calculation in the subsequent process of determining 2D key point coordinates of the target device, improve the efficiency of parameter acquisition, and reduce power consumption.

Figure 2:
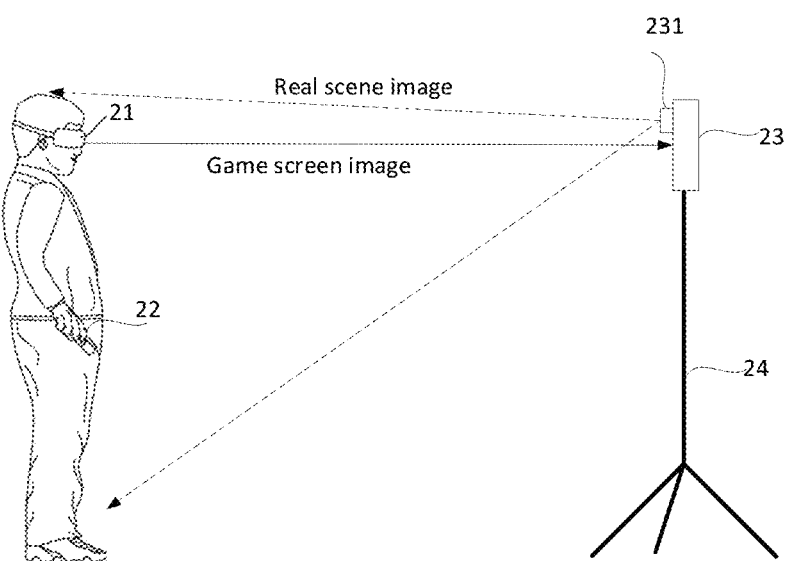
FIG. 2 is a schematic diagram showing an implementation scenario of a determination method of calibration information provided by an embodiment of the present disclosure.

FIG. 2 shows a schematic diagram of an implementation scenario of the determination method of calibration information provided by an embodiment of the present disclosure. For example, the image acquisition device is a mobile phone, and the target device is a gamepad. The scenario shown in FIG. 2 comprises a VR device 21, a gamepad 22, and a mobile phone 23. The mobile phone 23 is fixed through a tripod 24. A camera 231 in the mobile phone 23 can collect real scene images. The VR device 21 can send game screen images to the mobile phone 23, so that after determining calibration information of the camera 231 in the VR world coordinate system, the mobile phone 23 can obtain a game screen image from the perspective of the camera 231 according to the game screen image sent from the VR device and the calibration information, wherein the VR device establishes communication connections with both the mobile phone and the gamepad.

It should be noted that the relative position between the mobile phone and the user shown in FIG. 2 is illustrative. In actual scenarios, other relative positions are also possible. That is, in an actual scenario, a real scene image collected by the mobile phone (image acquisition device) can comprise an image of a user for any angle of view, such as an image on the front of the user, an image on a side of the user, or an image on the back of the user.

103: acquiring 2D key point coordinates of the target device in a camera coordinate system based on the target image.

In some embodiments, acquiring the 2D key point coordinates of the target device in the camera coordinate system based on the target image may comprise: inputting the target image into a key point extraction model, and obtaining 2D key point coordinates of the target device output by the key point extraction model, wherein the key point extraction model is a convolutional neural network model trained based on sample information comprising a plurality of sample images of the target device and 2D key point coordinates corresponding to the target device of each sample image.

There may be one or more 2D key points in the target image.

In the above embodiment, the key point extraction model used for the target device is trained in advance according to the sample information, so that in the subsequent calculation of 2D key point coordinates, these coordinates can be quickly determined in real time based on the key point extraction model, and the time required to determine 2D key point coordinates of the target device from the target image can be saved, and the parameter acquisition efficiency is improved.

104: determining calibration information of the image acquisition device in the VR world coordinate system according to the 2D key point coordinates, the 3D key point coordinates, a pose of the target device and a pose of the image acquisition device.

The 3D key point coordinates are the coordinates of 3D key points of the target device in the VR world coordinate system. The 3D keys correspond to the 2D keys. The number of the 3D keys can be the same as that of the 2D keys. The corresponding 3D keys and 2D keys can correspond to the same feature points of the target device.

The above calibration information comprises position information and orientation information. The pose of the above image acquisition device can be a pose of the image acquisition device in the SLAM (Simultaneous Localization and Mapping) world coordinate system.

In some embodiments, in the process of determining calibration information of the image acquisition device in the VR world coordinate system according to the 2D key point coordinates of the target device, the 3D key point coordinates of the target device, the pose of the target device and the pose of the image acquisition device, it is necessary to calculate a transformation of the pose of the image acquisition device from the SLAM world coordinate system to the VR world coordinate system. Therefore, first of all, a pose of the target device in the SLAM world coordinate system and a pose of the target device in the VR world coordinate system (which is obtained directly from the VR device) are needed to be acquired. Then, a relative transformation between the pose of the target device in the SLAM world coordinate system and the pose of the target device in the VR world coordinate system is calculated. Finally, calibration information of the image acquisition device in the VR world coordinate system can be obtained in conjunction with the pose of the image acquisition device in the SLAM world coordinate system.

In some embodiments, determining calibration information of the image acquisition device in the VR world coordinate system according to the 2D key point coordinates of the target device, the 3D key point coordinates of the target device, the pose of the target device and the pose of the image acquisition device may comprise: first, calculating a pose of the target device in the camera coordinate system according to the 2D key point coordinates of the target device, the 3D key point coordinates of the target device and the internal parameters of the image acquisition device; and then calculating the pose of the target device in the SLAM world coordinate system according to the pose of the target device in the camera coordinate system and a transformation matrix from the camera coordinate system to the SLAM world coordinate system, and calculating a transformation matrix from the SLAM world coordinate system to the VR world coordinate system according to the pose of the target device in the SLAM world coordinate system and the pose of the target device in the VR world coordinate system; then, calculating calibration information of the image acquisition device in the VR world coordinate system according to the calculated transformation matrix from SLAM world coordinate system to VR world coordinate system and the pose of image acquisition device in the SLAM world coordinate system.

In a case where the software operating system of a device where the image acquisition device is located is an IOS software operating system, the pose of the image acquisition device in the SLAM world coordinate system and the internal parameters of the image acquisition device can be obtained from ARKit images of real scenes obtained by the device where the image acquisition device is located. ARKit images are images obtained based on an application tool (ARKit). ARKit is an augmented reality development kit launched by Apple, and is a development kit that can provide AR experience in applications by integrating image information of the camera of the device and motion sensor information of the device. ARKit is a software development kit (SDK) for developing AR applications.

In a case where the operating system is an Android software operating system, the pose of the image acquisition device in the SLAM world coordinate system and the internal parameters of the image acquisition device need to be calculated according to images of real scenes taken by the image acquisition device in conjunction with a self-developed SLAM software algorithm.

The technical solution provided in the embodiments of the present disclosure has the following advantages over the related art: acquiring 3D key point coordinates and a pose of a target device in a VR world coordinate system determined by a VR device, wherein the target device is associated with the VR device; acquiring a target image collected by an image acquisition device, and acquiring 2D key point coordinates of the target device in a camera coordinate system based on the target image; and determining calibration information of the image acquisition device in the VR world coordinate system according to the 2D key point coordinates, the 3D key point coordinates, the pose of the target device and a pose of the image acquisition device, wherein the calibration information comprises position information and orientation information. With this solution, relevant data of calibration information can be calculated for the image acquisition device in the VR world coordinate system without manually moving the image acquisition device during the calibration process. For the acquisition of the above 2D key point coordinates, 3D key point coordinates, the pose of the target device, the pose of the image acquisition device and other parameters, it is also unnecessary to wear and remove the VR device repeatedly. Therefore, the calibration process can be simplified, and calibration information of the image acquisition device in the VR world coordinate system can be determined in a simple and efficient manner.

Figure 1B:
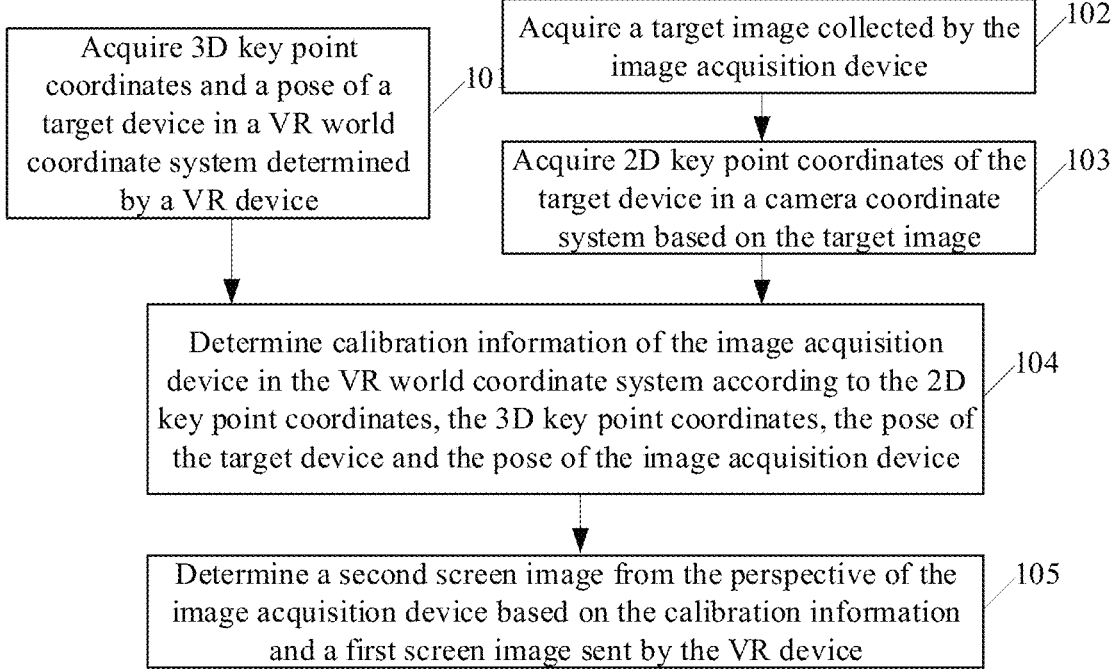
FIG. 1B is a flowchart of a method for processing screen images of a VR device provided in an embodiment of the present disclosure.

FIG. 1B is a flowchart of a method for processing screen images of a VR device provided in the embodiment of the present disclosure. This method comprises calibration information determination steps (101-104 in FIG. 1A) and step 105.

105: determining a second screen image from the perspective of the image acquisition device based on the calibration information and a first screen image sent from the VR device.

The above VR device establishes a communication connection with a device (such as a mobile phone) where the image acquisition device is located, and the device where the image acquisition device is located can receive the first image sent from the VR device.

According to the position information and orientation information of the camera in the VR world coordinate system, as well as the first screen image, a second screen image from the perspective of the image acquisition device can be determined.

Thus, the first image sent from the VR device can be processed in time based on the simple and efficient determination of the calibration information of the image acquisition device in the VR world coordinate system.

Figure 3:
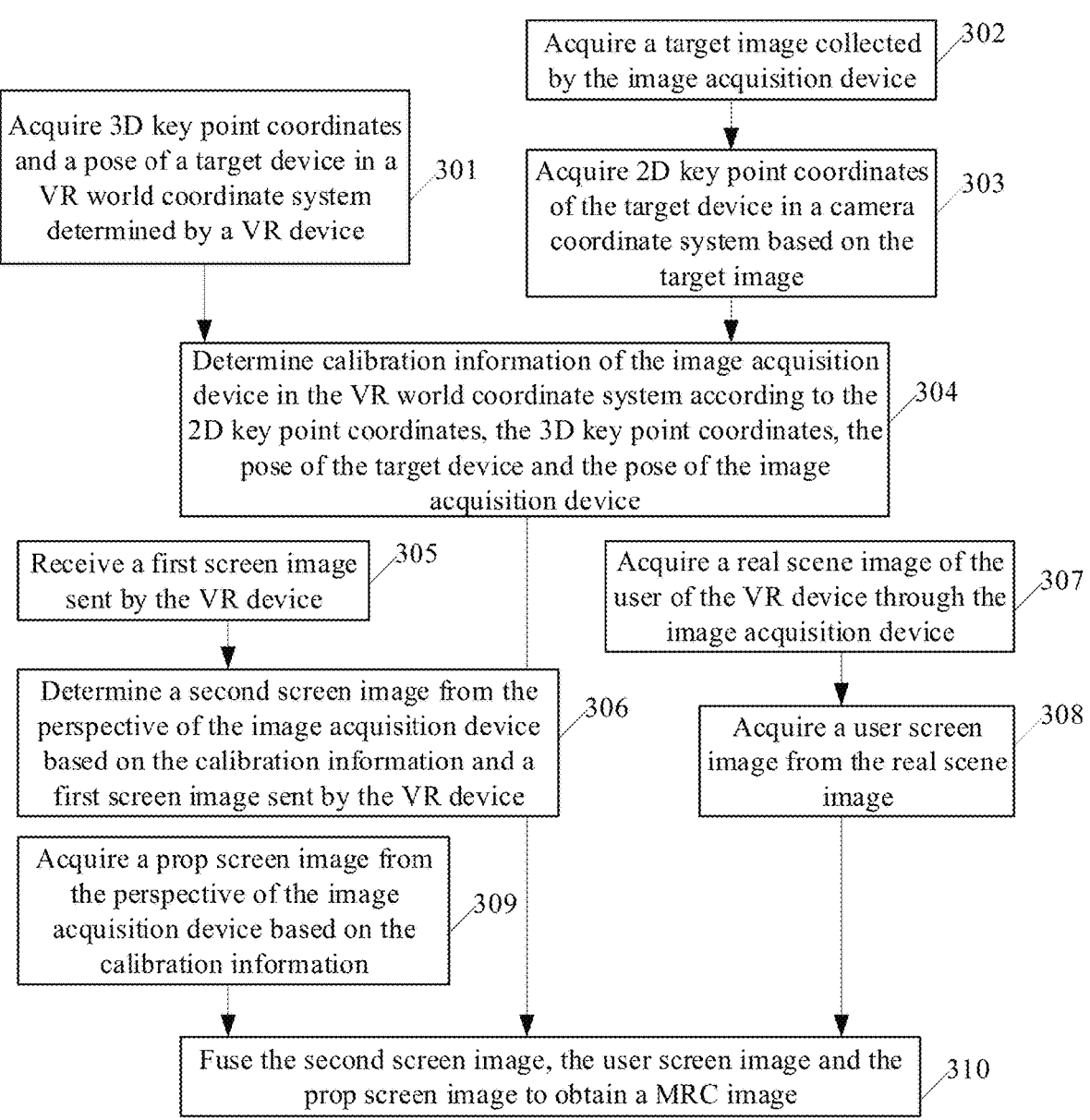
FIG. 3 is a flowchart of another determination method of calibration information provided by an embodiment of the present disclosure.

FIG. 3 shows a flowchart of another determination method of calibration information provided by an embodiment of the present disclosure. The method comprises the following steps.

301: acquiring 3D key point coordinates and a pose of a target device in a VR world coordinate system determined by a VR device.

The VR world coordinate system refers to the world coordinate system of the VR device.

302: acquiring a target image collected by the image acquisition device.

303: acquiring 2D key point coordinates of the target device in a camera coordinate system based on the target image.

304: determining calibration information of the image acquisition device in the VR world coordinate system according to the 2D key point coordinates, the 3D key point coordinates, the pose of the target device and a pose of the image acquisition device.

For the related discussion of above steps 301 to 304, reference can be made to the discussion of above steps 101 to 104, which will not be repeated here.

In the above calibration process of the image acquisition device, relevant data of calibration information can be calculated for the image acquisition device in the VR world coordinate system without manually moving the image acquisition device. For the acquisition of the above 2D key point coordinates, 3D key point coordinates, the pose of the target device, the pose of the camera and other parameters, it is also unnecessary to wear and remove the VR device repeatedly. Therefore, the calibration process can be simplified, and calibration information of the image acquisition device in the VR world coordinate system can be determined in a simple and efficient manner.

305: receiving a first screen image sent from the VR device.

The VR device establishes a communication connection with a device (such as a mobile phone) where the image acquisition device is located, and the device where the image acquisition device is located can receive the first image sent from the VR device.

306: acquiring a second screen image from the perspective of the image acquisition device based on the calibration information and a first screen image.

A second screen image from the perspective of the image acquisition device can be determined according to the position information and orientation information of the camera in the VR world coordinate system, as well as the first screen image.

Thus, the first screen image sent from the VR device can be processed in time based on the simple and efficient determination of the calibration information of the image acquisition device in the VR world coordinate system.

307: acquiring a real scene image of a user of the VR device through the image acquisition device.

The user's real scene image refers to a captured real scene image comprising the user's picture.

308: acquiring a user screen image from the real scene image.

A user screen image can be acquired from the real scene image using a Matting algorithm.

In some embodiments, the real scene image is inputted into a target matting model; and a user screen image in the real scene image output by the target matting model is acquired. The target matting model is obtained through training based on a set of sample images comprising multiple composite images, wherein each composite image is obtained by fusing a user image and an indoor scene image, and the user image comprises a target device worn or held by a target part of the user, and/or a VR device worn by the user.

The target device worn or held by the user's target part, as well as the VR device worn by the user, may be removed when a user's image is extracted in some matting algorithms, which will cause that the screen image finally generated for the VR device is not consistent with the user image in the actual scene, and thereby the screen image finally generated for the VR device is not realistic and natural. In the above embodiment, multiple frames of composite images obtained through fusing user images and the indoor scene image are added to the set of sample images to train the target matting model. Therefore, features such as the target device worn or held by a target part of the user and/or the VR device worn by the user in the user image can be retained, so that the matting effect can be more accurate, and the screen image generated for the VR device is more consistent with the actual scene.

309: acquiring a prop screen image from the perspective of the image acquisition device based on the calibration information.

Similar to the way of acquiring the second screen image, a prop screen image from the perspective of the image acquisition device can be acquired based on the calibration information.

310: fusing the second screen image, the user screen image and the prop screen image to obtain a MRC image.

Figure 4A:
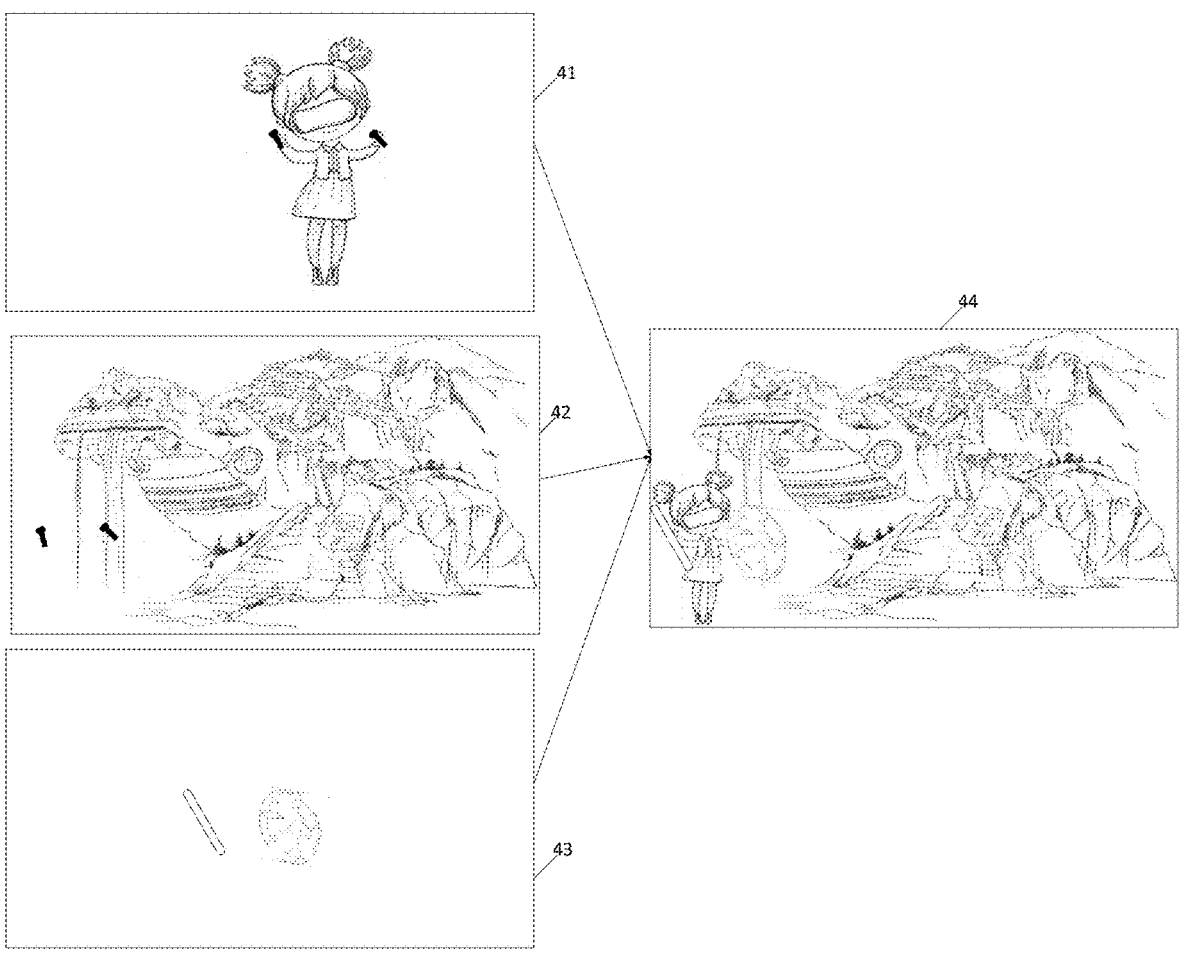
FIG. 4A is a schematic diagram of generating an MRC image provided by an embodiment of the present disclosure.

The prop screen image is a screen image of a prop associated with the target device. For example, if the target device is a gamepad, the prop screen image can be the image of a hand-held prop, and if the target device is a foot ring, the prop image can be the image of a foot wearable prop. FIG. 4A is a schematic diagram of generating an MRC image provided by an embodiment of the present disclosure. Assuming that the image acquisition device is a camera and the target device is a gamepad, as shown in FIG. 4A, the image 41 is the user's real scene image, from which a user screen image can be extracted. As shown in FIG. 4A, the image 42 is a screen image acquired from the perspective of the camera, that is, the second screen image. As shown in FIG. 4A, the image 43 is a prop screen image acquired from the perspective of the camera. The second screen image, the user screen image and prop screen image are fused to obtain the MRC image, i.e., image 44 shown in FIG. 4A.

The method provided by the embodiment of the present disclosure can first determine the second screen image from the perspective of the image acquisition device based on the calibration information in conjunction with the screen image of the VR device. Then, the second screen image, the user screen image in the real scene and the prop screen image are further used to fuse the user image in the real scene, the virtual screen image from the perspective of the image acquisition device and the virtual prop screen image, i.e., to fuse virtual images and a real scene image to obtain a MRC image.

In some embodiments, at least one of a first layer relationship and a second layer relationship between the user screen image and the second screen image is determined before fusing the second screen image, the user image and the prop screen image to obtain a MRC image.

In some embodiments, the method of acquiring the first layer relationship may comprise: performing depth estimation on the real scene image to obtain first depth information of the real scene image; acquiring second depth information of the second screen image; and determining the first layer relationship between the user screen image and the second screen image according to the first depth information and the second depth information.

It should be noted that the first layer relationship between the user screen image and the second screen image can be determined through other methods, for example, through defining a fixed layer relationship, or calculating the layer relationship between the user screen image and the second screen image in other methods, which is not specifically limited in the embodiments of the present disclosure.

In some embodiments, the method of acquiring the second layer relationship may comprise: detecting whether the user's target part is visible in the real scene image to determine the second layer relationship between the user screen image and the prop screen image; fusing the second screen image, the user image and prop screen image to obtain a MRC image according to at least one of the first layer relationship or the second layer relationship. In the real scene image, if the target part of the user is not visible, it can be determined that the layer where the user screen image is disposed is an upper layer of the layer where the prop screen image is disposed; if the target part of the user is visible, it can be determined that the layer where the user screen image is disposed is a lower layer of the layer where the prop screen image is disposed.

The target part described above can comprise, but is not limited to, hand, foot, face, etc., which is not specifically limited in the embodiments of the present disclosure.

It should be noted that the second layer relationship can be determined through other methods, for example, through defining a fixed layer relationship, or calculating the second layer relationship in other methods, which is not specifically limited in the embodiments of the present disclosure.

In the above embodiment, the first layer relationship between the user screen image and the second screen image is determined by depth estimation performed on the real scene image, and the second layer relationship between the user screen image and the prop screen image is determined by detecting whether the user's target part is visible in the real scene image, so that the layer relationship during rendering between the user and the game scene, and the layer relationship during rendering between the user and the prop in a 3D scene can be restored. Upon the MRC image is acquired in this way, the final rendered image has a clear layer relationship and can present a real 3D effect.

Figure 4B:
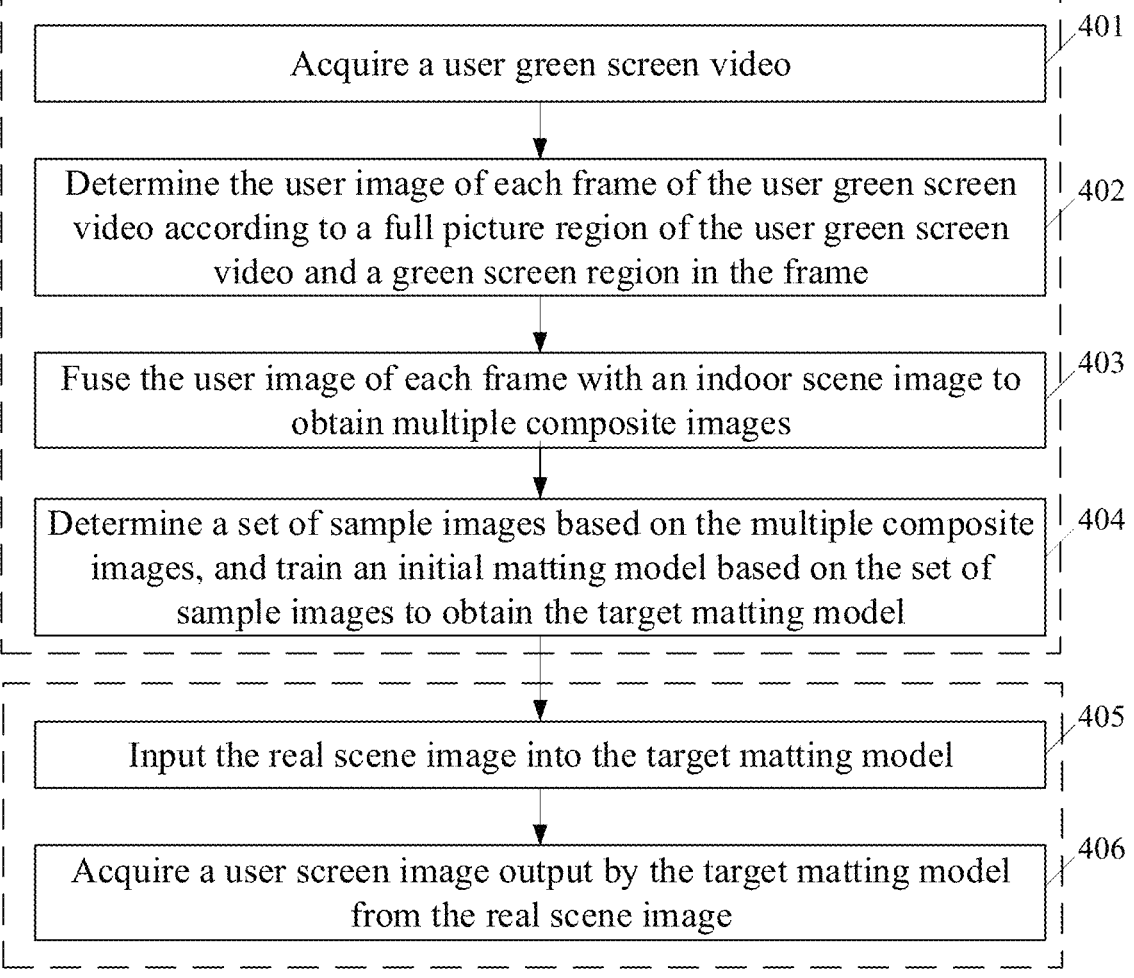
FIG. 4B is a flowchart of acquiring a user screen image from a real scene image provided by an embodiment of the present disclosure.

FIG. 4B is a flowchart of acquiring a user screen image from a real scene image provided by an embodiment of the present disclosure. The process comprises a model training process and a model application process, and comprises the following steps.

401: acquiring a user green screen video.

The user green screen video is a video of a user collected in a green screen scene. The video of the user in a green screen scene can be collected by the image acquisition device, in which the target device is worn or held by a target part of the user, and/or the VR device is worn by the user.

402: determining the user image of each frame of the user green screen video according to a full picture region of the user green screen video and a green screen region in the frame.

In some embodiments, determining the user image of each frame of the user green screen video according to a full picture region of the user green screen video and a green screen region in the frame may comprise, but is not limited to, steps 402a to 402f.

402a: acquiring a green screen region in each frame of the user green screen video.

The green screen region in each frame is a region where the green screen is located in the full picture region in each frame. The green screen region of each frame image comprises a user image located therein.

Figure 4C:
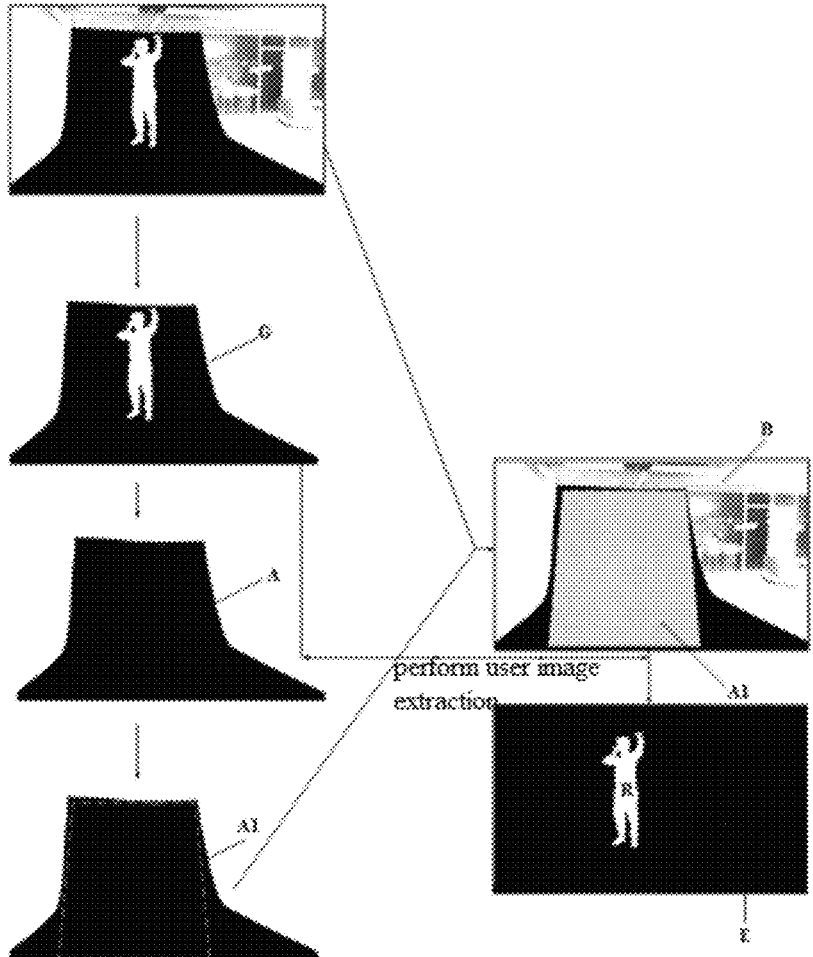
FIG. 4C is a schematic diagram of an implementation process of determining a user image provided by an embodiment of the present disclosure.

FIG. 4C is a schematic diagram of the implementation process of determining a user image provided by an embodiment of the present disclosure. The green screen region G shown in FIG. 4C represents a region where a green screen is located in the full picture region.

402b: performing pixel completion on the green screen region of each frame to obtain a green screen completion region of the frame.

For example, as shown in FIG. 4C, a corresponding green screen completion region A can be obtained by pixel completion performed on the green screen region G. The process shown in FIG. 4C can be executed for the green screen region of each frame image to obtain a corresponding green screen completion region A of the green screen region of each frame.

402c: calculating an intersection of the green screen completion regions of the various frames to obtain a minimum green screen completion region.

In the user green screen video, the green screen completion region may be in different positions in different frames, so the intersection of the green screen completion regions of the various frames can be calculated to determine an overlapping region thereof, that is, a minimum green screen completion region.

For example, as shown in FIG. 4C, after obtaining the green screen completion regions A of the various frames, their intersection can be calculated to obtain a minimum green screen completion region A1.

402d: removing the minimum green screen completion region from the full picture region of the user green screen video to obtain a green screen excluded region.

As shown in FIG. 4C, after removing the minimum green screen completion region A1 from the full picture region, a green screen excluded region B can be obtained.

402e: calculating the union of the green screen excluded region and a green screen extraction region of each frame to obtain a non-user image region of the frame.

The green screen extraction region of each frame is a remaining green screen region after user image extraction based on the green screen region of each frame.

402f: determining a user image for each frame according to the full picture region and the non-user image region of the frame.

For example, as shown in FIG. 4C, a green screen extraction region can be obtained for each frame after user image extraction performed on the green screen region G in the frame. Then, a non-user image region E is obtained for each frame through calculating the union of the green screen extraction region and the green screen excluded region B. Finally, a region outside the non-user image region E in the full image region can be determined for each frame image, that is, a user image of each frame image, for example, the user image R shown in FIG. 4C.

In the above embodiment, a method is provided to perform processing, based on the user green screen video, to acquire user images of various image in the user green screen video at one time. This method can obtain a large number of user images at one time, which can improve the computing efficiency.

In other embodiments, it is also possible to process multiple user green screen images respectively to obtain multiple user images in such a manner that each green screen user image is performed to obtain a corresponding user image. Then, the multiple user images obtained can be fused into indoor scene images.

403: fusing the user image of each frame with an indoor scene image to obtain multiple composite images.

Each composite image is obtained by fusing a user image and an indoor scene image, the user image comprising a target device worn or held by a target part of the user, and/or a VR device worn by the user.

In some embodiments, fusing the user image of each frame with an indoor scene image to obtain multiple composite images can be implemented through, but not limited to, steps 403a to 403d.

403a: determining a first coordinate vector of a user positioning point of a target user image.

The target user image is a user image of any one of the various frames. The user positioning point is a center point of a bottom edge of a bounding rectangle of the target user image, and a target positioning point is an arbitrary point in the indoor scene image.

In some embodiments, the user positioning point can be a point of some features of the part of the user.

The above determination of the center point of a bottom edge of a bounding rectangle as the user positioning point is due to the fact that the user's foot feature is usually close to the center point of the bottom edge of the bounding rectangle. Therefore, the user's foot feature can be located by taking this point as the user positioning point. Here, the center point of the bottom edge can also be understood in such a way that the center point of the bottom edge of the bounding rectangle is the center point of a rectangular edge closest to the user's foot feature.

In the above solution, the target user image is fused into an indoor scene image, which can simulate the user's image in the indoor scene. The set of sample images obtained in this way is more suitable for actual scenes, and a model trained using this set of sample images will meet the needs of actual scenes.

In some cases, the target user image comprises a complete user feature, and in other cases, the target user image does not comprise a complete user feature.

As an example, a user positioning point is determined based on the position of the user's foot, and a user image is fused into an indoor scene image at a target positioning point, which may comprise, but is not limited to, the following two cases.

Case 1: the target user image comprises the user's foot feature, and the target positioning point is a ground center point of a ground region in the indoor scene image.

To determine the target positioning point, first, a ground region in the indoor scene image is identified to determine a ground region in the indoor scene image, and then a ground center point of the identified ground region is identified through calculation.

Figure 4D:
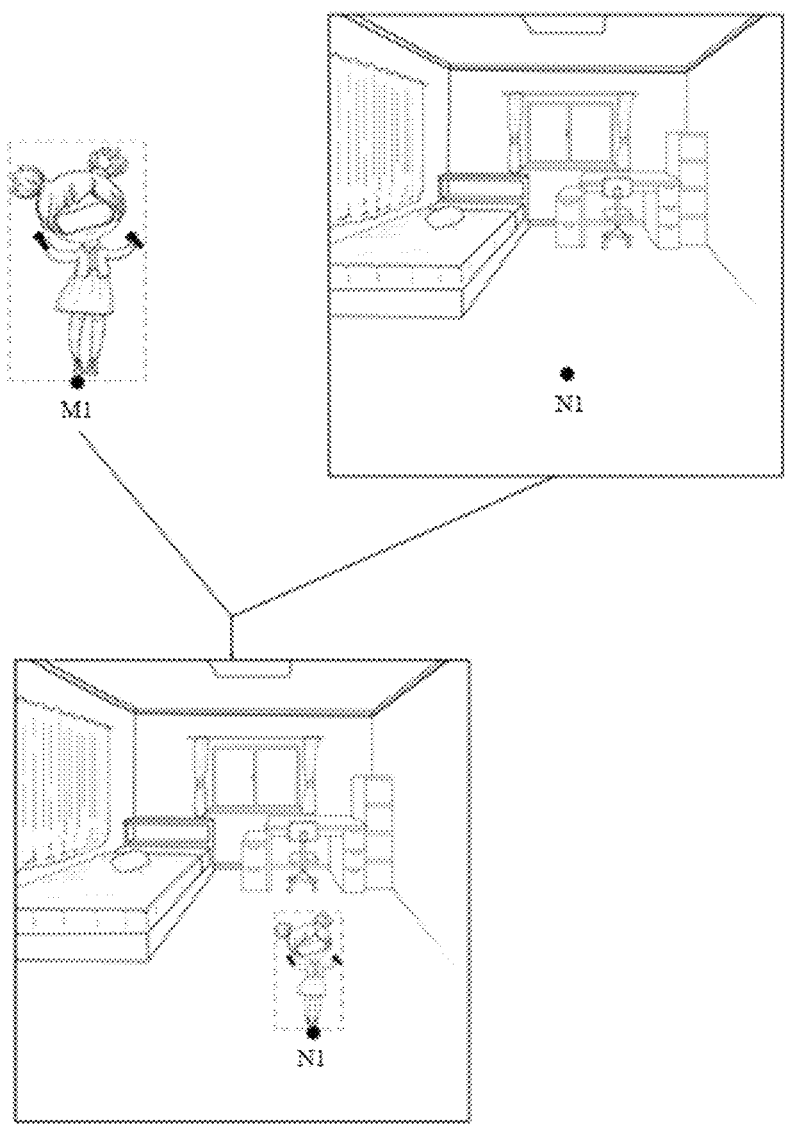
FIG. 4D is a schematic diagram of fusing a target user image into an indoor scene image provided by an embodiment of the present disclosure.

Exemplary, FIG. 4D is a schematic diagram of fusing a target user image into an indoor scene image provided by an embodiment of the present disclosure. First, a bounding rectangle of the target user image is determined, and a center point M1 of the bottom edge of the bounding rectangle is also determined. In this case, the target user image comprises the user's foot feature, and thus it is determined that the target positioning point is a ground center point N1 of the ground region in the indoor scene image, which is the target point to be fused to. Finally, the target user image is fused to the indoor scene image according to an offset vector between M1 and N1, so that the user positioning point M1 of the user image is located at the target positioning point N1 in the indoor scene image.

Case 2: the target user image does not comprise the user's foot feature, and the target positioning point is an arbitrary point on a bottom edge of the indoor scene image.

Figure 4E:
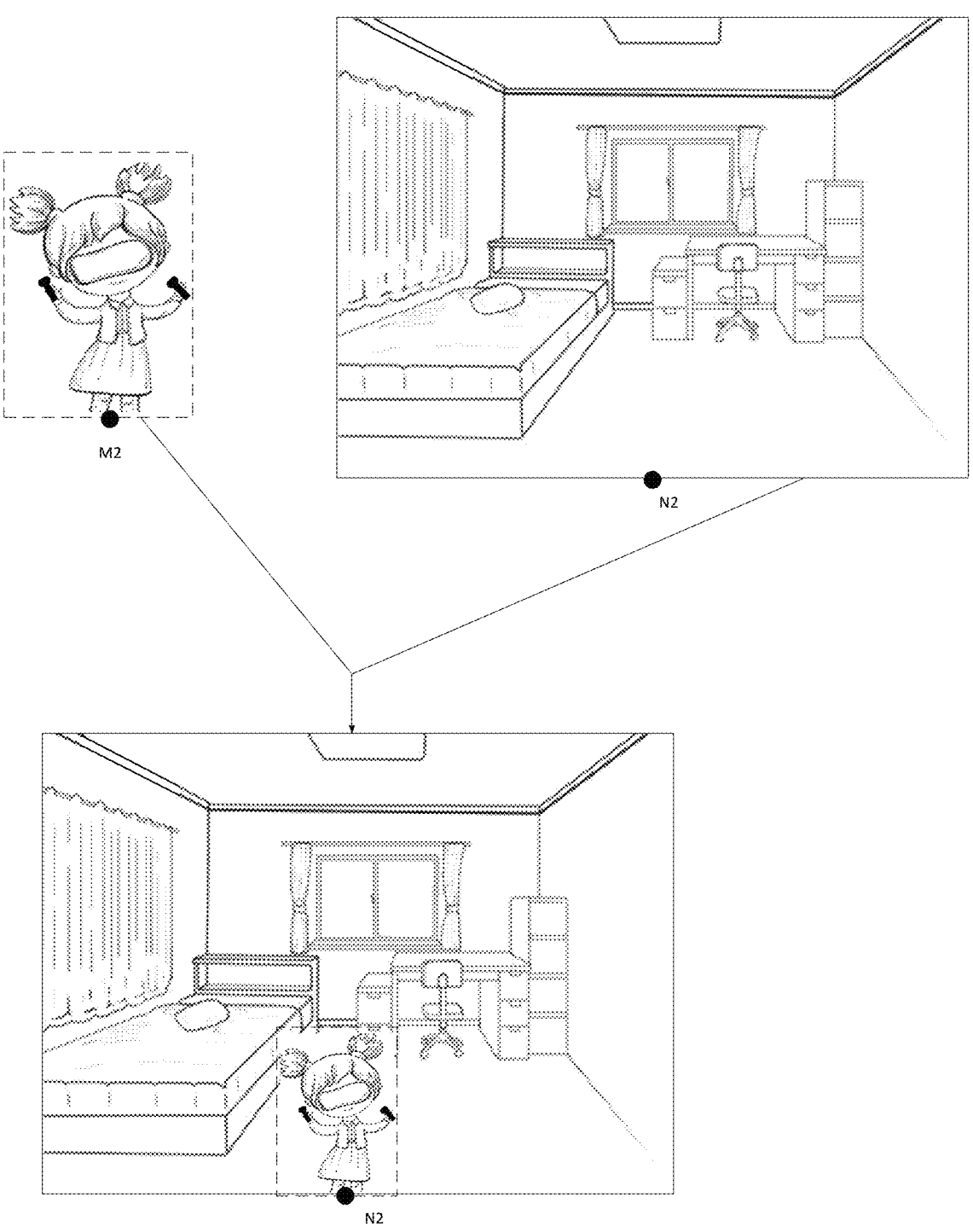
FIG. 4E is a schematic diagram of fusing a target user image into an indoor scene image provided by another embodiment of the present disclosure.

Exemplary, FIG. 4E is a schematic diagram of fusing a target user image into an indoor scene image provided by another embodiment of the present disclosure. A bounding rectangle of the target user image is determined, and a center point M2 of the bottom edge of the bounding rectangle is also determined. In this case, the target user image does not comprise the user's foot feature, and thus it is determined that the target positioning point is an arbitrary point N2 on the bottom edge of the indoor scene image, which is the target point to be fused to. Finally, the target user image is fused to the indoor scene image according to an offset vector between M2 and N2, so that the user positioning point M2 of the user image is located at the target positioning point N2 in the indoor scene image.

In the above embodiment, different target positioning points are set in the indoor scene image according to whether or not the user's foot feature is comprised in the target user image, so that the fusion image can be more consistent with the picture of the user's real-scene image captured in an indoor scene, so that the target fusion image finally obtained is more realistic and natural.

403*b*: determining a second coordinate vector of a target positioning point in the indoor scene image.

The user positioning point is a center point of a bottom edge of a bounding rectangle of the target user image, and a target positioning point is an arbitrary point in the indoor scene image.

403*c*: calculating an offset vector according to the first coordinate vector and the second coordinate vector.

403*d*: fusing the target user image to the indoor scene image to obtain a target composite image based on the offset vector.

The target user image is fused into the indoor scene image based on the offset vector, so that the user positioning point of the user image is located at the target positioning point in the indoor scene image to obtain a target composite image.

It should be noted that in the process of fusing the target user image to the indoor scene image based on the offset vector, the size of the target user image can be randomly increased. That is, the target user image can be randomly scaled, and then can be fused to the indoor scene image based on the offset vector.

404: determining a set of sample images based on the multiple composite images, and training an initial matting model based on the set of sample images to obtain the target matting model.

In some embodiments, determining a set of sample images based on the multiple composite images refers to taking the multiple composite image as all or some sample images of the set of sample images.

In some other embodiments, determining a set of sample images based on the multiple images may also comprise, using processed images as all or some sample images in the set of sample images after performing processes such as image rotation or image scaling processes based on the multiple images to obtain more processed images.

405: inputting the real scene image into the target matting model.

406: acquiring a user screen image output by the target matting model from the real scene image.

In the above embodiment, multiple composite images obtained through fusing user images and indoor scene images are added to the set of sample images to train the target matting model. Therefore, features such as the target device worn or held by a target part of the user and/or the VR device worn by the user in the user image can be retained, so that the matting effect can be more accurate, and the screen image generated for the VR device is more consistent with the actual scene.

Figure 5:
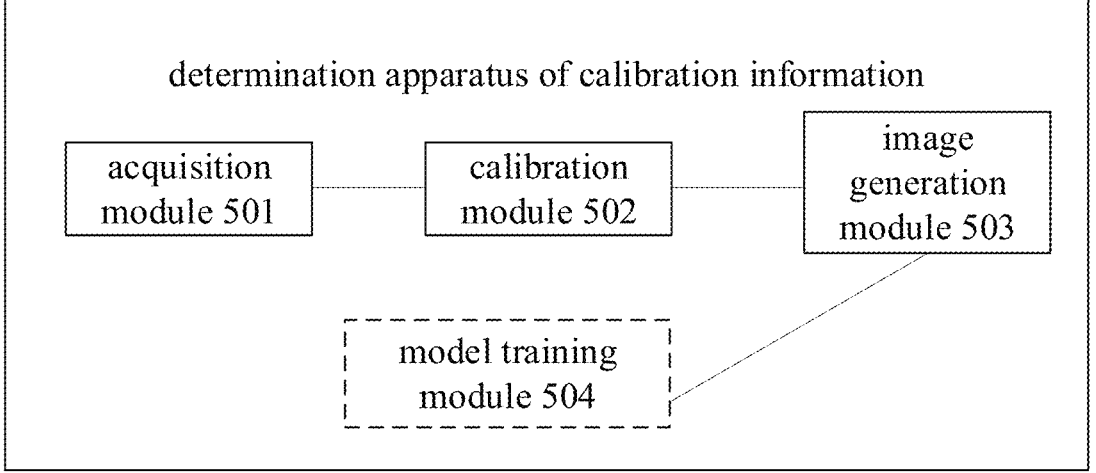
FIG. 5 is the structural block diagram of a determination apparatus of calibration information provided by an embodiment of the present disclosure.

FIG. 5 shows a structural block diagram of a determination apparatus of calibration information provided by an embodiment of the present disclosure. The apparatus comprises:

an acquisition module 501 for acquiring 3D key point coordinates and a pose of a target device in a Virtual Reality (VR) world coordinate system determined by a VR device, wherein the target device is associated with the VR device; and acquiring a target image collected by an image acquisition device, and acquiring 2D key point coordinates of the target device in a camera coordinate system based on the target image;

a calibration module 502 for determining calibration information of the image acquisition device in the VR world coordinate system according to the 2D key point coordinates, the 3D key point coordinates, the pose of the target device and a pose of the image acquisition device, wherein the calibration information comprises position information and orientation information.

As an optional embodiment of the present disclosure, the acquisition module 501 is particularly used for:

receiving the 3D key point coordinates and the pose of the target device in the VR world coordinate system sent from the VR device.

As an optional embodiment of the present disclosure, the acquisition module 501 is particularly used for:

acquiring an original image of the target device collected by the image acquisition device; and determining an image of a region of the target device from the original image, and cropping the image of the region of the target device from the original image as the target image.

As an optional embodiment of the present disclosure, the acquisition module 501 is particularly used for:

inputting the target image into a key point extraction model, to obtain 2D key point coordinates of the target device output by the key point extraction model, wherein the key point extraction model is a convolutional neural network model trained based on sample information comprising a plurality of sample images of the target device and 2D key point coordinates corresponding to the target device of each sample image.

As an optional embodiment of the present disclosure, the acquisition module 501 is further used for, receiving a first screen image sent from the VR device after determining the calibration information of the image acquisition device in the VR world coordinate system;

the apparatus further comprises:

an image generation module 503 for:

acquiring a second screen image from a perspective of the image acquisition device based on the calibration information and the first screen image.

As an optional embodiment of the present disclosure, the image generation module 503 is further used for:

acquiring a real scene image of a user of the VR device collected by the image acquisition device after determining the calibration information of the image acquisition device in the VR world coordinate system;

acquiring a user screen image from the real scene image;

acquiring a prop screen image from the perspective of the image acquisition device, the prop screen image being a screen image of a prop associated with the target device; and fusing the second screen image, the user screen image and the prop screen image to obtain a MRC image.

As an optional embodiment of the present disclosure, the image generation module 503 is further used for:

determining at least one of a first layer relationship or a second layer relationship before fusing the second screen image, the user screen image and the prop screen image to obtain the MRC image, wherein the first layer relationship is a layer relationship between the user screen image and the second screen image, the second layer relationship is a layer relationship between the user screen image and the prop screen image;

wherein the image generation module 503 is particularly used for:
fusing the second screen image, the user screen image and the prop screen image to obtain the MRC image according to at least one of the first layer relationship or the second layer relationship.

As an optional embodiment of the present disclosure, the image generation module 503 is particularly used for: performing depth estimation on the real scene image to obtain first depth information of the real scene image;
acquiring second depth information of the second screen image; and
determining the first layer relationship between the user screen image and the second screen image according to the first depth information and the second depth information.

As an optional embodiment of the present disclosure, the image generation module 503 is particularly used for:
determining the second layer relationship between the user screen image and the prop screen image in case that a target part of the user is detected to be visible in the real scene image, wherein the target part is a part where the target device is worn or held.

As an optional embodiment of the present disclosure, the image generation module 503 is particularly used for:
inputting the real scene image into a target matting model; and
acquiring a user screen image in the real scene image output by the target matting model,
wherein the target matting model is obtained through training based on a set of sample images comprising multiple composite images, each composite image being obtained by fusing a user image and an indoor scene image, the target device being worn on or held by a target part of the user and/or the VR device being worn by the user in the user image.

As an optional embodiment of the present disclosure, the apparatus further comprises:
acquiring a user green screen video before inputting the real scene image into the target matting model, the user green screen video being a user video collected in a green screen scene;
determining the user image of each frame of the user green screen video according to a full picture region of the user green screen video and a green screen region in the frame;
fusing the user image of each frame with an indoor scene image to obtain multiple composite images; and
determining a set of sample images based on the multiple composite images, and training an initial matting model based on the set of sample images to obtain the target matting model.

As an optional embodiment of the present disclosure, the model training module 504 is particularly used for:
acquiring a green screen region in each frame of the user green screen video;
performing pixel completion on the green screen region of each frame to obtain a green screen completion region of the frame;
calculating an intersection of the green screen completion regions of the various frames to obtain a minimum green screen completion region;
removing the minimum green screen completion region from the full picture region of the user green screen video to obtain a green screen excluded region;
calculating the union of the green screen excluded region and a green screen extraction region of each frame to obtain a non-user image region of each frame, the green screen extraction region of each frame being a remaining green screen region after user image extraction based on the green screen region of each frame; and
determining the user image for each frame according to the full picture region and the non-user image region of the frame.

As an optional embodiment of the present disclosure, the model training module 504 is particularly used for:
determining a first coordinate vector of a user positioning point of a target user image which is a user image of any one of the frames;
determining a second coordinate vector of a target positioning point in the indoor scene image;
calculating an offset vector according to the first coordinate vector and the second coordinate vector; and
fusing the target user image into the indoor scene image based on the offset vector to obtain a target composite image, wherein the user positioning point of the user image is located at the target positioning point in the indoor scene image.

As an optional embodiment of the present disclosure, the user positioning point is a center point of a bottom edge of a bounding rectangle of the target user image; and the target positioning point is an arbitrary point in the indoor scene image.

As an optional embodiment of the present disclosure, the target user image comprises a user foot feature, and the target positioning point is a center point of a ground region in the indoor scene image.

As an optional embodiment of the present disclosure, the target user image does not comprise a user foot feature, and the target positioning point is an arbitrary point on a bottom edge of the indoor scene image.

Figure 6:
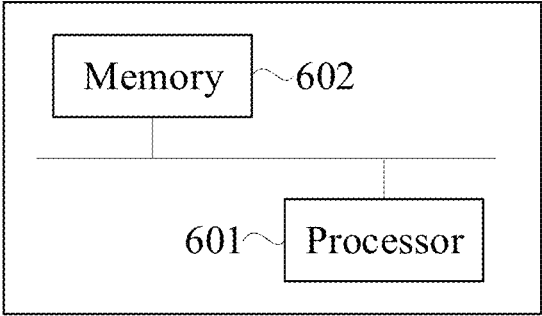
FIG. 6 is a structural diagram of an electronic device provided by an embodiment of the present disclosure.

FIG. 6 shows a structural block diagram of an electronic device provided by an embodiment of the present disclosure, the electronic device comprising: a processor 601, a memory 602 and a computer program stored in the memory 602 and executable on the processor 601, which when executed by the processor 601 implements the determination method of calibration information of the above method embodiment. The electronic device can achieve the same technical effect, which will not be described in detail to avoid repetition.

An embodiment of the present disclosure provides a computer-readable storage medium having stored thereon a computer program that, when executed by a processor, implements various steps of the calibration information determination method of the above method embodiment, and can achieve the same technical effect, which will not be described in detail to avoid repetition.

The computer-readable storage medium may be Read-Only Memory (ROM), Random Access Memory (RAM), magnetic disks, or optical disks, etc.

An embodiment of the present disclosure provides a computer program product having stored thereon a computer program that, when executed by a processor, implements various steps of the determination method of calibration information of the above method embodiment, and can achieve the same technical effect, which will not be described in detail to avoid repetition.

One skilled in the art should understand that, the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable storage media having computer-usable program code embodied therein.

In the present disclosure, the processors may be central processing units (CPUs) or other general-purpose processors, digital signal processors (DSPs), application specific integrated circuits (ASICs), Field-Programmable Gate Arrays (FPGAs) or other programmable logic devices, or discrete hardware components such as discrete gates or transistors. The general-purpose processor may be a microprocessor, or the processor may be any conventional processor or the like.

In the present disclosure, the memory may comprise non-permanent memory in a computer-readable medium, random access memory (RAM) and/or non-volatile memory, such as read only memory (ROM) or flash RAM. The memory is an example of a computer-readable medium.

In the present disclosure, the computer-readable media comprise permanent and non-permanent, removable and non-removable storage media. The storage medium can realize information storage by any method or technology. The information can be computer-readable instructions, data structures, program modules, or other data. Examples of computer storage media comprise, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, CD-ROM, digital versatile disc (DVD) or other optical storage, magnetic cassettes, magnetic tape, magnetic disk storage or other magnetic storage devices, or any other non-transmission media that can be used to store information that can be accessed by computing devices. According to the definition herein, computer-readable media does not comprise transitory media, such as modulated data signals and carrier waves.

Note that, in this description, the use of relational terms, if any, such as "first" and "second" and the like are used solely to distinguish one from another entity or action without necessarily requiring or implying any actual such relationship or order between such entities or actions. Further, terms "comprise", "include" or their any other variations are intended to encompass non-exclusive composition, so that a process, method, product or device comprising a series of factors may comprise not only these factors, but also other factors that are not listed explicitly, or factors intrinsic to this process, method, product or device. Without limitation, a factor defined by wording "comprise a . . . " does not exclude the existence of other same factors in a process, method, product or device comprising such factor.

The above descriptions are only specific embodiments of the present disclosure, so that those skilled in the art can understand or implement the present disclosure. Various modifications to these embodiments will be apparent to those skilled in the art, and the generic principles defined herein may be implemented in other embodiments without departing from the spirit or scope of the present disclosure. Accordingly, the present disclosure should not be limited to the specific embodiments described herein, but should be accorded the broadest scope consistent with the principles and novel features disclosed herein.

What is claimed is:

1. A determination method of calibration information, comprising:
acquiring 3D key point coordinates and a pose of a target device in a Virtual Reality (VR) world coordinate system determined by a VR device, wherein the target device is associated with the VR device;
    acquiring a target image collected by an image acquisition device, and acquiring 2D key point coordinates of the target device in a camera coordinate system based on the target image;
    determining calibration information of the image acquisition device in the VR world coordinate system according to the 2D key point coordinates, the 3D key point coordinates, the pose of the target device and a pose of the image acquisition device, wherein the calibration information comprises position information and orientation information;
    receiving a first screen image sent from the VR device after determining the calibration information of the image acquisition device in the VR world coordinate system;
    acquiring a second screen image from a perspective of the image acquisition device based on the calibration information and the first screen image;
    acquiring a real scene image of a user of the VR device collected by the image acquisition device after determining the calibration information of the image acquisition device in the VR world coordinate system;
    acquiring a user screen image from the real scene image;
    acquiring a prop screen image from the perspective of the image acquisition device, the prop screen image being a screen image of a prop associated with the target device; and
    fusing the second screen image, the user screen image and the prop screen image to obtain a mixed reality capture (MRC) image.

2. The determination method according to claim 1, wherein the acquiring 3D key point coordinates and a pose of a target device in a VR world coordinate system determined by a VR device comprises:
    receiving the 3D key point coordinates and the pose of the target device in the VR world coordinate system sent from the VR device.

3. The determination method according to claim 1, wherein the acquiring a target image collected by an image acquisition device comprises:
    acquiring an original image of the target device collected by the image acquisition device; and
    determining an image of a region of the target device from the original image, and cropping the image of the region of the target device from the original image as the target image.

4. The determination method according to claim 1, wherein the acquiring 2D key point coordinates of the target device in a camera coordinate system based on the target image comprises:
    inputting the target image into a key point extraction model, to obtain 2D key point coordinates of the target device output by the key point extraction model,
    wherein the key point extraction model is a convolutional neural network model trained based on sample information comprising a plurality of sample images of the target device and 2D key point coordinates corresponding to the target device of each sample image.

5. The determination method according to claim 1, further comprising:
    determining at least one of a first layer relationship or a second layer relationship before fusing the second screen image, the user screen image and the prop screen image to obtain the MRC image, wherein the first layer relationship is a layer relationship between the user screen image and the second screen image, the second layer relationship is a layer relationship between the user screen image and the prop screen image, and at least one of the first layer relationship or the second layer relationship are used for fusing the second screen image, the user screen image and the prop screen image to obtain the MRC image.

6. The determination method according to claim 5, wherein the determining a first layer relationship comprises:

performing depth estimation on the real scene image to obtain first depth information of the real scene image;

acquiring second depth information of the second screen image; and determining the first layer relationship between the user screen image and the second screen image according to the first depth information and the second depth information.

7. The determination method according to claim 5, wherein the determining a second layer relationship comprises:

determining the second layer relationship between the user screen image and the prop screen image in case that a target part of the user is detected to be visible in the real scene image, wherein the target part is a part where the target device is worn or held.

8. The determination method according to claim 1, wherein the acquiring a user screen image from the real scene image comprises:

inputting the real scene image into a target matting model; and acquiring a user screen image in the real scene image output by the target matting model, wherein the target matting model is obtained through training based on a set of sample images comprising multiple composite images, each composite image being obtained by fusing a user image and an indoor scene image.

9. The determination method according to claim 8, further comprising:

acquiring a user green screen video before inputting the real scene image into the target matting model, the user green screen video being a user video collected in a green screen scene;

determining the user image of each frame of the user green screen video according to a full picture region of the user green screen video and a green screen region in the frame;

fusing the user image of each frame with an indoor scene image to obtain multiple composite images; and determining a set of sample images based on the multiple composite images, and training an initial matting model based on the set of sample images to obtain the target matting model.

10. The determination method according to claim 9, wherein the determining the user image of each frame of the user green screen video according to a full picture region of the user green screen video and a green screen region in the frame comprises:

acquiring a green screen region in each frame of the user green screen video;

performing pixel completion on the green screen region of each frame to obtain a green screen completion region of the frame;

calculating an intersection of the green screen completion regions of the various frames to obtain a minimum green screen completion region;

removing the minimum green screen completion region from the full picture region of the user green screen video to obtain a green screen excluded region;

calculating the union of the green screen excluded region and a green screen extraction region of each frame to obtain a non-user image region of each frame, the green screen extraction region of each frame being a remaining green screen region after user image extraction based on the green screen region of each frame; and determining the user image for each frame according to the full picture region and the non-user image region of the frame.

11. The determination method according to claim 9, wherein the fusing the user image of each frame with an indoor scene image to obtain multiple composite images comprises:

determining a first coordinate vector of a user positioning point of a target user image which is a user image of any one of the frames;

determining a second coordinate vector of a target positioning point in the indoor scene image;

calculating an offset vector according to the first coordinate vector and the second coordinate vector; and fusing the target user image into the indoor scene image based on the offset vector to obtain a target composite image, wherein the user positioning point of the user image is located at the target positioning point in the indoor scene image.

12. The determination method according to claim 11, wherein:

the user positioning point is a center point of a bottom edge of a bounding rectangle of the target user image; and the target positioning point is an arbitrary point in the indoor scene image.

13. The determination method according to claim 12, wherein:

the target user image comprises a user foot feature, and the target positioning point is a center point of a ground region in the indoor scene image; or the target user image does not comprise a user foot feature, and the target positioning point is an arbitrary point on a bottom edge of the indoor scene image.

14. The determination method according to claim 8, wherein the target device is worn on or held by a target part of the user.

15. The determination method according to claim 8, wherein the VR device is worn by the user in the user image.

16. A non-transitory computer-readable storage medium, on which a computer program is stored, which when executed by a processor implements the determination method of calibration information according to claim 1.

17. An electronic device, comprising:

a memory; and a processor coupled to the memory, the processor configured to execute the determination method of calibration information for performing instructions comprising:

acquiring 3D key point coordinates and a pose of a target device in a Virtual Reality (VR) world coordinate system determined by a VR device, wherein the target device is associated with the VR device;

acquiring a target image collected by an image acquisition device, and acquiring 2D key point coordinates of the target device in a camera coordinate system based on the target image;

determining calibration information of the image acquisition device in the VR world coordinate system according to the 2D key point coordinates, the 3D key point coordinates, the pose of the target device and a pose of the image acquisition device, wherein the calibration information comprises position information and orientation information;

receiving a first screen image sent from the VR device after determining the calibration information of the image acquisition device in the VR world coordinate system;

acquiring a second screen image from a perspective of the image acquisition device based on the calibration information and the first screen image;

acquiring a real scene image of a user of the VR device collected by the image acquisition device after determining the calibration information of the image acquisition device in the VR world coordinate system;

acquiring a user screen image from the real scene image;

acquiring a prop screen image from the perspective of the image acquisition device, the prop screen image being a screen image of a prop associated with the target device; and fusing the second screen image, the user screen image and the prop screen image to obtain a mixed reality capture (MRC) image.

* * * * *